(12) United States Patent
Beucher et al.

(10) Patent No.: US 7,957,833 B2
(45) Date of Patent: Jun. 7, 2011

(54) ASSET LOCALIZATION IDENTIFICATION AND MOVEMENT SYSTEM AND METHOD

(75) Inventors: Peter J. Beucher, Owens Cross Roads, AL (US); Hans Gregory Schantz, Huntsville, AL (US)

(73) Assignee: Q-Track Corporation, Huntsville, AL (US)

( * ) Notice: Subject to any disclaimer, the term of this patent is extended or adjusted under 35 U.S.C. 154(b) by 964 days.

(21) Appl. No.: 11/890,350

(22) Filed: Aug. 6, 2007

(65) Prior Publication Data
US 2007/0282482 A1    Dec. 6, 2007

Related U.S. Application Data

(63) Continuation-in-part of application No. 11/473,595, filed on Jun. 23, 2006, now Pat. No. 7,755,552, which is a continuation-in-part of application No. 11/272,533, filed on Nov. 10, 2005, now Pat. No. 7,307,595, which is a continuation-in-part of application No. 11/215,699, filed on Aug. 30, 2005, now Pat. No. 7,414,571, which is a continuation-in-part of application No. 10/958,165, filed on Oct. 4, 2004, now Pat. No. 7,298,314, which is a continuation-in-part of application No. 10/355,612, filed on Jan. 31, 2003, now Pat. No. 6,963,301, which is a continuation-in-part of application No. 11/500,660, filed on Aug. 8, 2006, now Pat. No. 7,538,715.

(60) Provisional application No. 60/637,779, filed on Dec. 21, 2004, provisional application No. 60/404,602, filed on Aug. 19, 2002, provisional application No. 60/404,604, filed on Aug. 19, 2002, provisional application No. 60/841,598, filed on Aug. 31, 2006.

(51) Int. Cl.
*G06F 7/00* (2006.01)

(52) U.S. Cl. ....... 700/215; 700/229
(58) Field of Classification Search ........... 700/215, 700/214, 213, 225, 229; 455/41.1, 41.2; 342/125, 127; 340/127, 572.2, 825.49
See application file for complete search history.

(56) References Cited

U.S. PATENT DOCUMENTS
5,260,694 A    11/1993    Remahl
(Continued)

FOREIGN PATENT DOCUMENTS
JP    2003418263    11/2004

OTHER PUBLICATIONS

Access, Inc., "Active Radio Frequency Identification (RFID) Powers productivity and Protection in the Enterprise", white paper, 11 pages, 2005.

(Continued)

*Primary Examiner* — Gene Crawford
*Assistant Examiner* — Ramya Prakasam
(74) *Attorney, Agent, or Firm* — James Richards

(57) ABSTRACT

A system and method for identification and location of an asset by tracking the mover of the asset using a locating device associated with the mover and identifying the asset using an identification reader associated with the mover and a passive identification tag associated with the asset. A single mover may move many assets. An asset is identified; the mover then moves the asset to a destination location, whereupon the mover and asset position are determined. The asset location may then be recorded in memory. The measurement of the destination location may be extended from the location measured by the active location device by using additional measurement devices, for example a forklift height sensor. A further embodiment utilizes RFID or barcode technology for the passive tag and may utilize near field positioning technology for the active location device.

23 Claims, 7 Drawing Sheets

U.S. PATENT DOCUMENTS

| | | | |
|---|---|---|---|
| 5,565,858 A | 10/1996 | Guthrie | |
| 5,725,253 A | 3/1998 | Salive et al. | |
| 5,774,876 A | 6/1998 | Woolley et al. | |
| 5,780,826 A | 7/1998 | Hareyama et al. | |
| 6,353,406 B1* | 3/2002 | Lanzl et al. | 342/118 |
| 6,496,806 B1* | 12/2002 | Horwitz et al. | 705/28 |
| 6,550,674 B1 | 4/2003 | Neumark | |
| 6,669,089 B2* | 12/2003 | Cybulski et al. | 235/385 |
| 6,724,308 B2 | 4/2004 | Nicholson | |
| 6,739,507 B2 | 5/2004 | Kudyba | |
| 6,825,766 B2 | 11/2004 | Hewitt et al. | |
| 6,959,862 B2 | 11/2005 | Neumark | |
| 6,972,682 B2 | 12/2005 | Lareau et al. | |
| 7,005,968 B1* | 2/2006 | Bridgelall | 340/10.42 |
| 7,151,979 B2 | 12/2006 | Andersen et al. | |
| 2002/0008621 A1 | 1/2002 | Barritz et al. | |
| 2003/0083964 A1 | 5/2003 | Horwitz et al. | |
| 2003/0089771 A1* | 5/2003 | Cybulski et al. | 235/385 |
| 2003/0148775 A1* | 8/2003 | Spriestersbach et al. | 455/456 |
| 2004/0010339 A1* | 1/2004 | Mountz | 700/216 |
| 2004/0070503 A1 | 4/2004 | Monahan | |
| 2004/0102870 A1 | 5/2004 | Andersen et al. | |
| 2005/0065861 A1 | 3/2005 | Bann | |
| 2005/0187836 A1 | 8/2005 | Wolfe | |
| 2005/0195083 A1 | 9/2005 | Venture et al. | |
| 2005/0234641 A1 | 10/2005 | Marks et al. | |
| 2005/0240317 A1 | 10/2005 | Kienzle-Lietl | |
| 2005/0242169 A1 | 11/2005 | Michal, III | |
| 2006/0125356 A1* | 6/2006 | Meek et al. | 312/215 |
| 2007/0205894 A1* | 9/2007 | Nelson et al. | 340/572.1 |
| 2007/0285240 A1* | 12/2007 | Sensenig et al. | 340/572.1 |

OTHER PUBLICATIONS

Mobile and RFID Data Systems, "Aware / Truck", Mobile and RFID Data Systems, Inc., 2 pages, 2005.

Intermec, "Beyond the Tag—Finding RFID value in manufacturing and distribution applications", white paper, printed 2005.

* cited by examiner

ASSET LOCALIZATION IDENTIFICATION AND MOVEMENT SYSTEM AND METHOD

RELATED APPLICATIONS

The present application is a continuation-in-part of U.S. patent application Ser. No. 11/473,595 titled: "Space efficient magnetic antenna system," filed Jun. 23, 2006 by Schantz et al. which is a continuation-in-part of U.S. patent application Ser. No. 11/272,533 titled: "Near field location system and method," filed Nov. 10, 2005 by Schantz et al., which further claims the benefit under 35 USC 119(e) of provisional application Ser. No. 60/637,779, titled: "Near field amplitude positioning system and method," filed Dec. 21, 2004 by Schantz et al., all of which are incorporated herein by reference in their entirety. The present application is further a continuation-in-part of U.S. patent application Ser. No. 11/215,699 titled: "Low frequency asset tag tracking system and method," filed Aug. 30, 2005 by Schantz et al. which is a continuation-in-part of U.S. patent application Ser. No. 10/958,165 titled: "Near field electromagnetic positioning system and method," filed Oct. 4, 2004 by Schantz et al. which is a continuation-in-part of U.S. patent application Ser. No. 10/355,612 titled: "System and Method for near field electromagnetic ranging," filed Jan. 31, 2003 by Schantz et al. which further claims the benefit under 35 USC 119(e) of provisional application Ser. No. 60/404,602 and 60/404,604 filed Aug. 19, 2002 by Schantz et al., all of which are also incorporated herein by reference in their entirety. This application is also a continuation in part of U.S. patent application Ser. No. 11/500,660, titled "Electromagnetic location display system and method," filed Aug. 8, 2006 by Langford et al., and this application claims the benefit under 35 USC 119(e) of U.S. provisional patent application 60/841,598, titled "System and method for simulated dosimetry using a real time location system," filed Aug. 31, 2006 by Schantz. All of the above listed US patent and patent applications are hereby incorporated herein by reference in their entirety.

GOVERNMENT LICENSE RIGHTS

The U.S. Government has a paid up license in this invention and the right in limited circumstances to require the patent owner to license others on reasonable terms as provided for by the terms of contract OII-0646339 awarded by National Science Foundation.

BACKGROUND

1. Field of the Invention

The present invention relates generally to systems and methods for wireless asset and personnel locating.

2. Background of the Invention

Within a warehouse or logistics system, there is an ongoing need to provide a continuously updated inventory and to know the location of each asset. Proposed methods use a mix of technology in the form of bar codes and the like with software manually updated for location information. Automated location information typically includes active devices that can be too expensive for all but the most valuable assets. RFID tags and barcodes have been proposed for inventory control in a warehouse or logistics system, because of their low cost and ease of use, but they cannot be read at a distance, requiring physical proximity to read the tag and requiring a fork lift operator to exit the fork lift to operate the barcode reader and manually match the entry with the location. Location equipment can be relatively bulky and costly, too bulky and costly to be assigned one to one with every asset as some assets may be smaller than and cost less than the location equipment. One popular form of location equipment, GPS, lacks the precision to locate an asset to a bin on a shelf and lacks coverage inside a building, particularly a building with a metal roof or other complex metal structure. Location equipment that is not associated and identified with a particular asset lacks a way to identify the asset being located without manual entry.

In view of the foregoing, there is a great need for a location and identification system and method that can provide accurate location information and asset identification at a reasonable cost.

BRIEF SUMMARY OF THE INVENTION

Briefly, the present invention pertains to a system and method for identification and location of an asset by tracking the mover of the asset using an active location device located with the mover and identifying the asset using an identification reader located with the mover and a passive identification tag located with the asset. A single mover may move many assets. An asset is identified; the mover then moves the asset to a destination location, whereupon the mover and asset position are determined. The asset location may then be recorded in memory. The measurement of the destination location may be extended from the location measured by the active location device by using additional measurement devices, for example a forklift height sensor. In one embodiment, the passive tag reader and active location device may be packaged together and may utilize common signaling to a central controller. A further embodiment utilizes RFID or barcode technology for the passive tag and may utilize near field positioning technology for the active location device.

These and further benefits and features of the present invention are herein described in detail with reference to exemplary embodiments in accordance with the invention.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE PREFERRED EMBODIMENTS

Overview of the Invention

Figure 1:
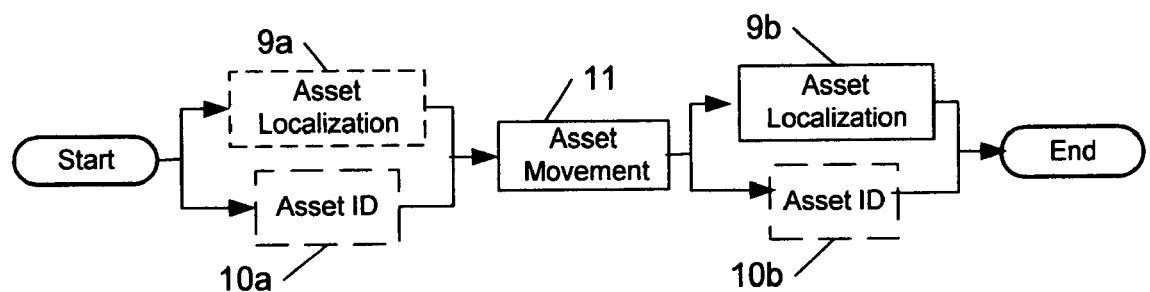
FIG. 1 is an exemplary process flow diagram showing an asset identification, localization, and movement process in accordance with the present invention.

The present invention provides a system for automated positioning of potentially thousands of items in a warehouse or other logistics staging operation by combining the best features of RFID or barcode tags with the capabilities of wireless active tracking devices to provide a low cost system for maintaining location awareness of every item in the warehouse.

RFID tags are typically low cost passive tags that can be excited by RF energy, typically from within a meter or so and respond by transmitting an ID number and potentially other status information. Barcode tags include the familiar barcodes of the super market and include numerous standards and formats including two dimensional barcodes capable of high density information. Barcode tags are typically optical and are read optically. Numerous other similar techniques have been developed and are continually being developed for the numerous applications of these devices. Within this disclosure, these devices are collectively referred to as identification tags whether they are applied as tags or stick on labels or built into the asset, or otherwise associated with the asset. Identification tags are advantageous for their very low cost, low weight and small size.

Wireless active tracking devices are wireless devices that can track an object's movement and measure the object's position to sufficient accuracy to identify the position of the object within the correct bin or region in the storage area One such technology well suited to a warehouse environment is near field positioning technology, near field positioning technology, typically utilizes multiple transmitters at known locations transmitting to a localizer receiver at the unknown location or multiple receivers at known locations receiving a signal from a transmitter at the unknown location. Other configurations and architectures may also be used. Near field electric and magnetic phase and amplitudes may be compared to find range and position. Further details on near field position measurement may be found in U.S. Pat. No. 6,963,301 as well as the other applications which have been incorporated herein by reference above.

Near field signals appear to be resistant to disturbance from multipath and other effects typically found indoors. Thus, near field signals may offer advantages over higher frequency positioning systems. Further, near field signals offer convenient directional information when used with magnetic antennas, in particular, an orthogonally oriented pair of magnetic antennas. The directional information may be used to enhance location accuracy.

Wireless positioning devices are typically larger in size than RFID tags and require electrical power from batteries or plug in. The system of the present invention applies the advantages of low cost and small size of the ID tag to each asset, where low cost and small size are needed and incorporates the advantages of the wireless positioning system by placing the positioning system on the mover where the cost of the positioning system can be applied to a virtually countless number of assets by repeated usages. Thus, the benefits and shortcomings of the ID and positioning devices are complementary—each device overcomes the shortcomings of the other device, enabling a system that would not be practical with either single device type alone.

Asset Identification, Localization, and Movement Process

FIG. 1 is an exemplary process flow diagram showing an asset identification, localization, and movement process in accordance with the present invention. The steps of FIG. 1 may be performed in any order, as desired. Of significance with respect to the steps of FIG. 1 is that the localization equipment is installed on or otherwise associated with the mover, as is the ID reader. A low cost ID tag is attached or otherwise associated with the asset. Referring to FIG. 1, the process may begin with asset identification 10a and may also optionally include asset localization 9a. Typically, a worker is instructed to move an asset to a new location within a warehouse. The worker first finds the asset by going to the last known location of the asset 9a and looking for the asset according to an asset identification 10a (typically a barcode number or RFID). When the asset is found, and identified 10a, the asset is picked up and moved 11 to the new location. The new location may not be precisely identified until the worker arrives at the area and finds an empty spot. Upon placing the asset at the new location, the asset location is measured 9b precisely and recorded in a database. The asset identification may then be optionally verified 10b. In an alternative sequence, the asset may be identified 10b at the time of final placement and localization 9b. (Localization means measuring the location of the asset in coordinates meaningful to the facility.) Other sequences of localization and identification may be desirable for other scenarios. Thus, the localization and identification is accomplished without installing expensive active trackers on each asset.

Figure 2:
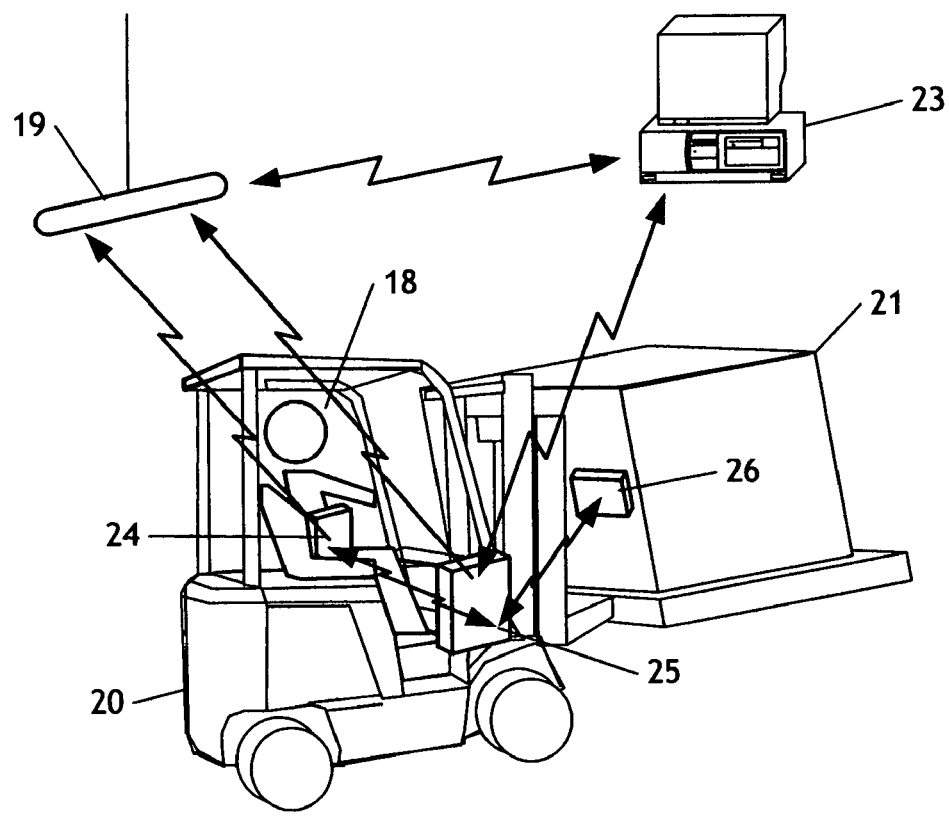
FIG. 2 is an exemplary schematic diagram describing one embodiment a system for identification, localization, and movement of an asset.

FIG. 2 is an exemplary schematic diagram describing one embodiment a system for identification, localization, and movement of an asset. The embodiment of FIG. 2 comprises a worker 18, a forklift 20, an active location tag 24 co-located with worker 18, a localizing ID reader (LIDR) 25, one or more locator receivers 19, a computer 23, and a passive ID tag 26 co-located with an asset 21. The worker 18 with or without the vehicle (e.g. forklift 20) acts as a movement agent capable of moving asset 21 between locations. The LIDR 25 is a device with both active location capability and passive ID tag reading capability housed in the same unit, thus eliminating issues relating to associating the ID tag reader with the location tag.

An active location tag 24 co-located with worker 18 works in conjunction with locator receiver 19 and computer 23 to localize worker 18 and thus associated asset 21. A LIDR 25 co-located with forklift 20, in conjunction with a locator receiver 19 and computer 23, may also serve for localizing forklift 20 and associated asset 21. The LIDR 25 and passive ID tag 26 co-located with asset 21 cooperate to serve as identifying means for asset 21. Whereas, FIG. 2 illustrates the possible use of both an active locator tag associated with the worker and a LIDR associated with the forklift, only one locator is necessary.

As shown in FIG. 2, the LIDR is mounted on the body of the forklift where the LIDR can sense tags on assets loaded at the lower position of the lift. Alternatively, the LIDR may be located on the lift to be lifted up with the asset and positioned forward next to the asset to better represent the actual position of the asset.

In operation, the active locator tag 24 (associated with a movement agent, such as a worker 18) transmits a signal to one or more locator receivers 19, as necessary to determine a location measurement A computer 23 accepts data from at least one locator receiver 19 and determines the location of active tag 24 and, thus, the movement agent, such as a worker 18. If asset localization process 9a and/or 9b is performed in conjunction with asset identification process 10a and/or 10b, then associated asset 21 becomes both localized and identified. By performing asset localization process 9a and 9b before and after asset movement process 11, an accurate location for asset 21 may be maintained in computer 23.

In alternative embodiments, asset identification process 10 may be performed by an active locator tag 24 associated with the asset 21 (rather than the mover) transmitting a signal to a locator receiver 19. The signal may be modulated so as to uniquely identify asset 21. Alternatively, a generic signal may be transmitted at a unique frequency or at a unique time so as to uniquely identify asset 21. A data interface 54 to active locator tag 24 may allow active tag 24 to respond on command from computer 23 so as to uniquely identify asset 21.

In a preferred embodiment, however, asset identification process 10 may be performed by a passive tag reader 28 associated in location with a movement agent, such as worker 18. Physical association of the passive tag reader with the movement agent may be by being carried by the worker or by being mounted on a forklift operated by the worker or other similar arrangement. Logical association of the active locator tag information with the passive ID tag reader information may be made possible by a data exchange or handshaking between passive ID tag reader 28 and active locator tag 24, as each device will have a serial number identifying the device. In alternate embodiments, passive ID tag reader 28 may convey data to computer 23 intermediate active locator tag 24, i.e., by sending data through active locator tag 28, thus providing associated location and identification data for asset 21. In further embodiments, passive ID tag reader 28 may provide identification data directly to computer 23 in conjunction with adequate identifying information pertinent to active tag 24 to enable computer 23 to associate a measured location of active tag 24 with identification information relevant to asset 21. For example, each device may separately communicate with the computer over the network, but the two devices may be defined or configured in software as being fixed to the same forklift.

In still further alternate embodiments, association may follow from co-locating functionality of passive tag reader 28 and active tag 24 in localizing ID reader, LIDR 25. The LIDR 25 is a single unit with active locator tag and passive ID tag reading capability. A worker 18 with co-located active tag 24 and transportation vehicle such as a forklift 20 with co-located LIDR 25 may similarly be associated by a data exchange or handshaking between active tag 24 and LIDR 25, the results of said data exchange or handshaking being conveyed to computer 23.

Passive tag reader 28 reads a passive tag 26 associated with asset 21. Passive tag 26 may be a bar code, and RFID tag, an optical pattern tag, an alternate technology tag, or some combination of passive tag modalities. One combination of particular value is a bar code or optical pattern combined with an RFID tag.

The asset identification, localization, and movement process continues with asset movement process 11. Asset movement process 11 comprises a movement agent acting so as to transport asset 21. Typical movement agents include, but are not limited to, a worker 18 either solo or in conjunction a transporter such as a hand truck, forklift 20, pallet jack, crane, reach truck, side loader, order picker, or other material handler or lifter. Further benefits and features of the asset identification, localization, and movement process may be better understood with reference to an illustrative logistics process.

An Illustrative Logistics Process

Figure 3:
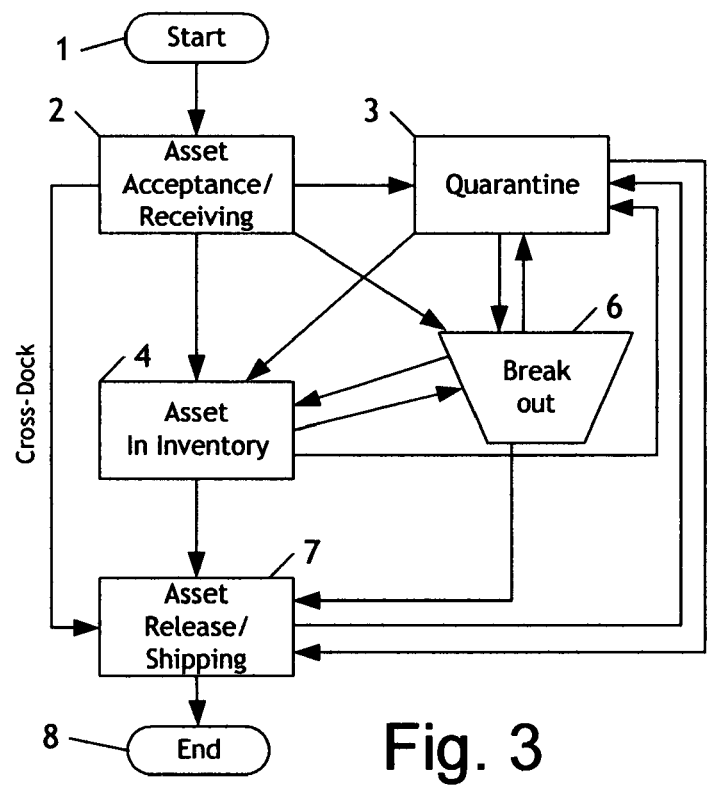
FIG. 3 is a process flow diagram showing an illustrative logistics process encompassing the asset identification, localization, and movement process of FIG. 1.

FIG. 3 is a process flow diagram showing an illustrative logistics process encompassing the asset identification, localization, and movement process of FIG. 1. Each movement line indicated between two of the blocks may be performed in accordance with the identification, localization and movement process of the present invention. The illustrative logistics process is not intended to be a comprehensive or universally applicable description of all logistics processes. Rather, the illustrative logistics process of FIG. 3 is intended to illustrate the potential benefits of the asset identification, localization, and movement process in a logistics process.

The illustrative logistics process begins with start block 1 and proceeds with asset acceptance and receiving process 2 in which an asset in receiving, like asset 21, is received and accepted. A critical aspect of asset acceptance and receiving process 2 is a determination of where an asset in receiving should go next. If an asset in receiving has been mistakenly shipped, if paperwork accompanying an asset in receiving is flawed, or if some other significant problem is identified with an asset in receiving, then the illustrative logistics process may continue with a quarantine process 3. If an asset in receiving is to be stored for sufficient time to justify placing an asset in receiving into inventory, then the illustrative logistics process continues with asset in inventory process 4. If an asset in receiving is to be immediately released or shipped, then the illustrative logistics process may continue with a cross-dock transfer to an asset release and shipping process 7. If an asset in receiving comprises sub-assets that require repackaging, subdivision, or recombination, then the illustrative logistics process may continue with asset break-out process 6.

The illustrative logistics process further comprises a quarantine process 3. In a quarantine process 3, an asset in quarantine (like asset 21) is placed in secure storage because of some problem identified in paperwork, a mis-shipment, or other problem necessitating secure storage of an asset in quarantine. If the problem is satisfactorily resolved, the illustrative logistics process may continue with asset in inventory process 4. Alternatively, if an asset in quarantine comprises sub-assets that require repackaging, subdivision, or recombination, then the illustrative logistics process may continue with asset break-out process 6. Finally if an asset in quarantine is to be released, shipped, or returned to the point of origin, then the illustrative logistics process may continue with a cross-dock transfer to an asset release and shipping process 7.

The illustrative logistics process further comprises an asset in inventory process 4. An asset in inventory process 4 involves an asset (like asset 21) being stored, for instance, in a pallet rack (like pallet rack 66), or in a staging or other storage area. If an asset in inventory has been mistakenly shipped, if paperwork accompanying an asset in inventory is flawed, or if some other significant problem is identified with an asset in inventory, then the illustrative logistics process may continue with a quarantine process 3. If an asset in inventory is to be released or shipped, then the illustrative logistics process may continue with an asset release and shipping process 7. If an asset in inventory comprises sub-assets that require repackaging, subdivision, or recombination, then the illustrative logistics process may continue with asset break-out process 6.

An asset in inventory may be subject to a periodic identification such as in asset identification process 10. Further, an asset in inventory may be subject to a periodic localization such as in asset localization process 9.

The illustrative logistics process further comprises an asset break-out process 6. Asset break-out process 6 involves an asset in break-out (like asset 21) being divided into sub-assets and being repackaged, processed, sub-divided, and/or recombined so as to create new assets. For instance, an asset in break-out may be a pallet comprising six particular goods requiring repackaging to go to six different destinations. One asset in break out may be divided into multiple assets in break-out, multiple assets in break-out may be combined into a smaller number of assets in break-out, or more complicated combinations and divisions are possible.

If an asset in break-out is to be released or shipped, then the illustrative logistics process may continue with an asset release and shipping process 7. If an asset in break-out has been mistakenly shipped, if paperwork accompanying an asset in break-out is flawed, or if some other significant problem is identified with an asset in break-out, then the illustrative logistics process may continue with a quarantine process 3. If an asset in break-out is to be stored for sufficient time to justify placing an asset in receiving into inventory, then the illustrative logistics process continues with asset in inventory process 4.

The illustrative logistics process further comprises asset release and shipping process 7. Asset release and shipping process 7 involves an asset in shipping being processed for release and shipment. If an asset in shipping is shipped, then the illustrative logistics process terminates in end block 8. If an asset in shipping has been mistakenly subjected to asset release and shipping process 7, then the illustrative logistics process may continue with a quarantine process 3 in which the further disposition of an asset in shipping may be decided.

An Illustrative Logistics Facility

Figure 4:
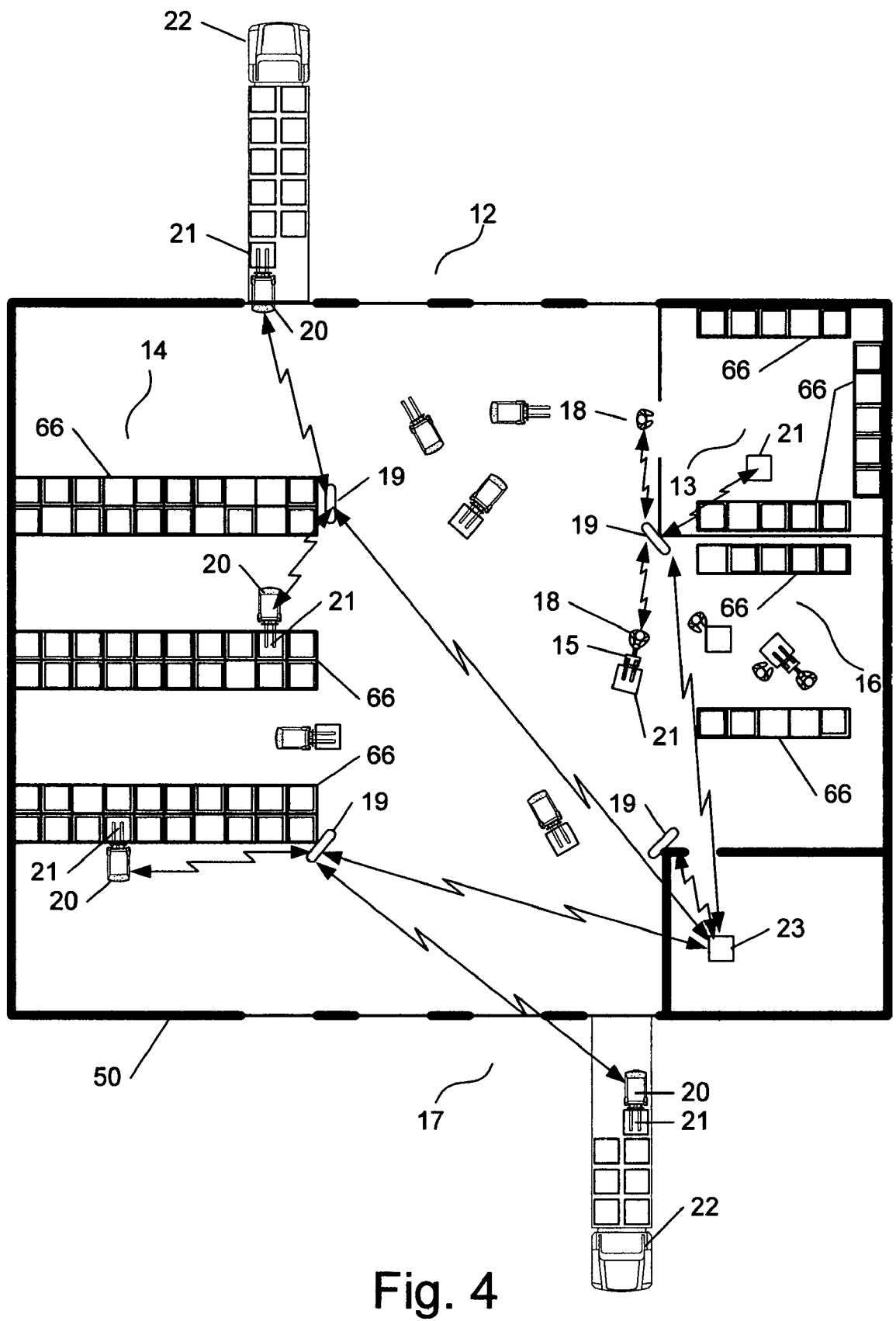
FIG. 4 is a schematic diagram of an illustrative logistics facility.

FIG. 4 is a schematic diagram of an illustrative logistics facility 50. The illustrative logistics facility 50 is not intended to be comprehensive and universally applicable to all logistics facilities. Rather, the illustrative logistics facility of FIG. 4 is intended to illustrate the benefits of the asset identification, localization, and movement process in a typical logistics facility, either stand-alone or as a department in a larger business or other enterprise.

The illustrative logistics facility 50 comprises an acceptance and receiving area 12, inventory area 14, quarantine zone 13, break-out area 16, and release and shipping area 17. The illustrative logistics facility 50 further includes assets (like asset 21), workers (like worker 18), forklifts (like forklift 20), hand trucks (like hand truck 15), locator receivers (like locator receiver 19), pallet racks (like pallet rack 66), and a computer (like computer 23).

In receiving area 12, forklift 20 picks up asset 21 from truck 22. A LIDR 25 co-located with forklift 20 relays location and identification information via locator receiver 19 to computer 23. Computer 23 may send data to LIDR 25 to instruct worker 18 where to transport asset 21. When forklift 20 drops off asset 21 at a destination, a LIDR 25 co-located with forklift 20 relays location information via locator receiver 19 to computer 23. In alternate embodiments, a LIDR 25 co-located with forklift 20 may further relay identification information via locator receiver 19 to computer 23 as a double-check or confirmation of the original identification when forklift 20 drops off asset 21.

In asset break-out area 16, a worker 18 is leaving with an asset 21 conveyed by a hand truck 15. Worker 18 identifies asset 21 by using passive tag reader 28. Active tag 24 co-located with worker 18 relays location information on worker 18 via locator receiver 19 to computer 23.

Note that in accordance with the present invention, particularly valuable assets may warrant continuous monitoring and may have associated thereon a dedicated active location tag 24, which may include identification information within the active location tag. For example, in quarantine area 13, a particularly valuable asset 21 with a co-located active location tag 24 relays location information on worker 18 via locator receiver 19 to computer 23. Active location tag 24 may include an on board accelerometer 53 to detect motion and alert computer 23 via locator receiver 19 if motion occurs. A worker 18 entering quarantine area 13 may be tracked to maintain a security log of those having entered quarantine area 13 or to ensure that only authorized workers (like worker 18) have entered quarantine area 13.

Asset Identification, Localization, and Movement System Features

Figure 5:
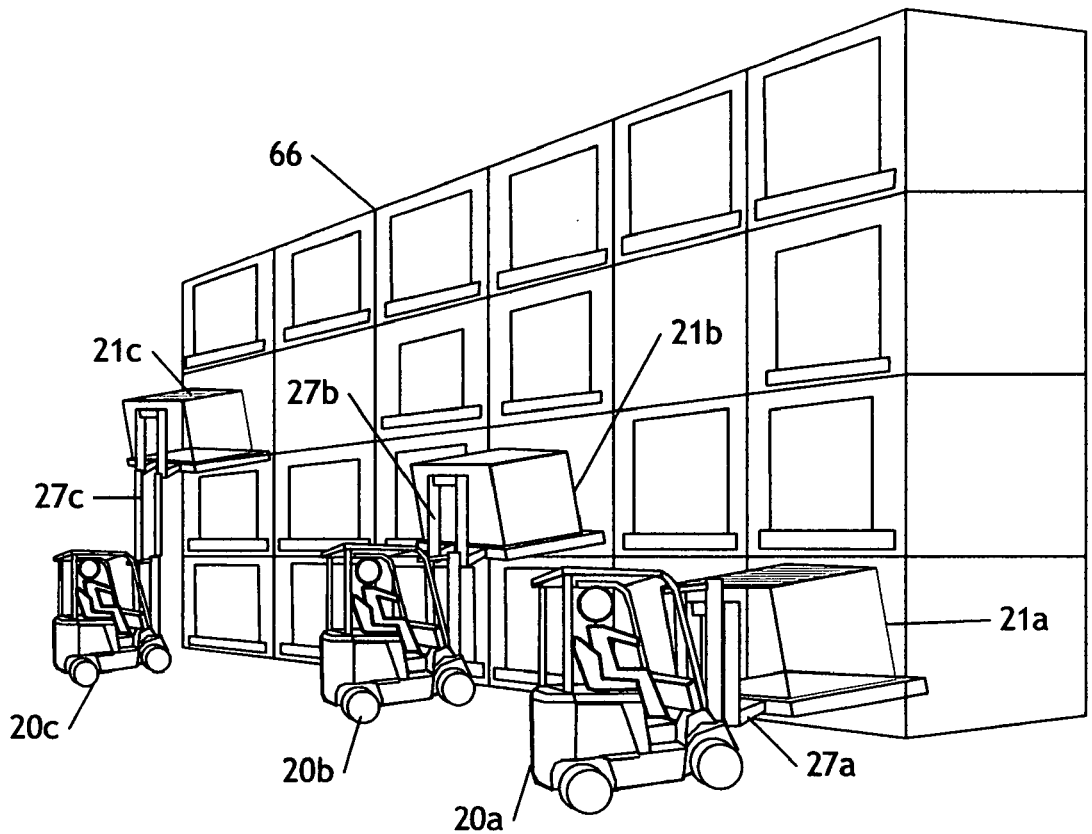
FIG. 5 is an exemplary schematic diagram describing forklifts placing assets at various levels in a rack.

FIG. 5 is an exemplary schematic diagram describing forklifts placing assets at various levels in a rack. Asset location in the vertical dimension requires additional location determination resources. In one embodiment, locator receivers 19 may be placed at the floor level and an additional set may be placed at the ceiling level to provide vertical received signal differences to resolve the vertical dimension.

In a further alternative, a set of locator receivers may be placed in a plane with sufficient numbers to triangulate in three dimensions. However, dilution of precision limits the ability of the tracking system to determine elevation using location devices co-located in a common horizontal plane.

In a third alternative embodiment, elevation of an asset 21 in a pallet rack 66 may be determined by sensing the forklift elevation with an elevation sensor. Typically, an elevation sensor may be coupled to the mechanical lift 27 for the forklift 20. The elevation signal is then conveyed to the computer 23 either directly via the network or through the active location tag 24 or LIDR 25 associated with the forklift 20. As shown in FIG. 5, three forklifts 20a-20c are unloading three assets 21a-21c into three different heights in pallet rack 66. For each different height, the respective fork lifting mechanisms 27a-27c are extended to different lengths as may be measured by a sensor coupled to the lift mechanism (sensor internal to mechanism 27a-27c).

In a further alternative, where the lift device has multiple dimensions of lift and/or extension or travel, such as a crane, the extension dimensions may be sensed and added to the location determined from the localizer receivers to determine the asset location. To add horizontal extension information, a direction must also be known.

In a further alternative, the active location tag signal may be directional, indicating the horizontal orientation (azimuth) of the active location tag by using radio direction techniques. In one embodiment the azimuth of the active location tag is determined by a magnetic compass sensor. In another embodiment the azimuth is determined by radio direction signals.

In a further aspect, the location of the active location tag that is measured when the asset is placed in the destination location may be offset from the actual asset location. For example, if the active location tag is one meter back from the forks of the forklift, the position measured is actually in the aisle in front of the asset. However, the offset may be accommodated by noting that the forklift may be operated to consistently measure asset position from directly in front of each respective asset. Thus, each asset may be paired one to one with a corresponding location such that the corresponding locations for each asset are not ambiguous. Further, that a forklift returning to a measured location for a particular asset will be in position to load the identified asset even though the asset may actually be extended from the measured location.

Figure 6:
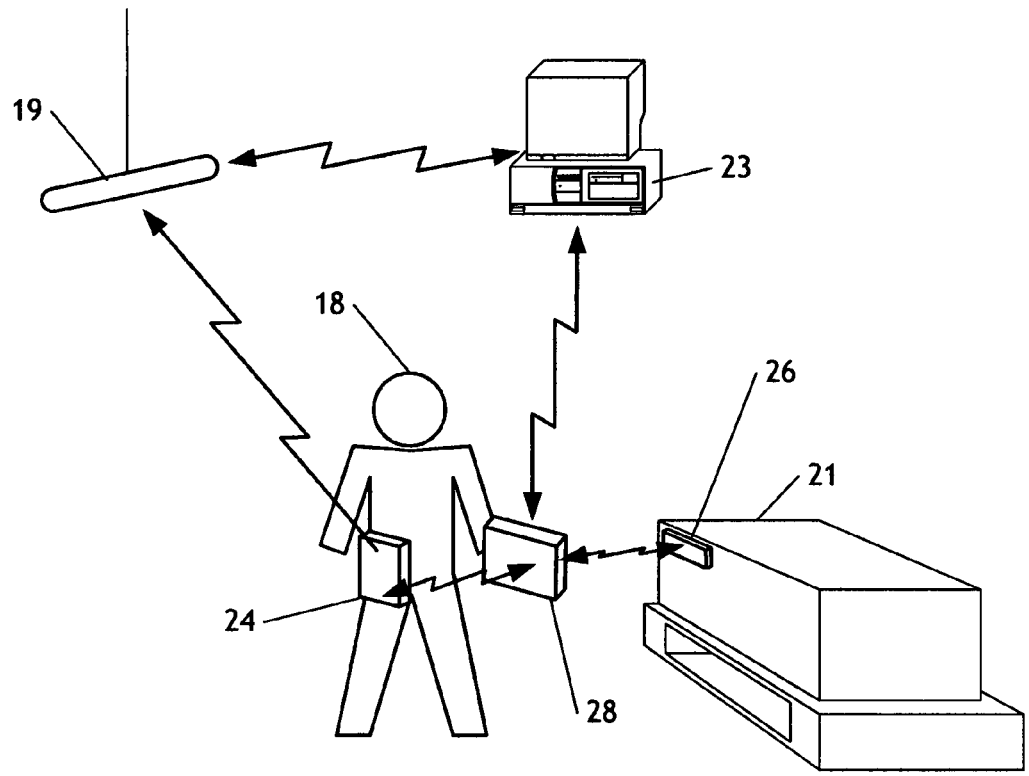
FIG. 6 is a schematic diagram showing an exemplary embodiment asset and personnel localizing system involving a worker using a passive tag reader.

FIG. 6 is a schematic diagram showing an exemplary embodiment asset and personnel localizing system involving a worker 18 using a passive tag reader 28 to identify an asset 21. A first alternate embodiment system for identification, localization, and movement of an asset 21 comprises a worker 18, an active tag 24 co-located with worker 18, a passive tag reader 28, a locator receiver 19, a computer 23, and a passive tag 26 co-located with an asset 21.

An active tag 24 co-located with worker 18 works in conjunction with locator receiver 19 and computer 23 to serve as localizing means, localizing worker 18 and thus associated asset 21. A passive tag reader 28 and a passive tag 26 co-located with asset 21 cooperate to serve as identifying means for asset 21.

Near-Field Location System

In a preferred embodiment, the active location tag and locating receiver of the present invention are based on transmitting and receiving near field signals. Location by near field signals is fully described in the US patents and patent applications incorporated by reference above. In summary, near field signals are signals received within a near field of the transmitter. The near field is best within 1/6 wavelength, but the effects may be utilized out to one wavelength or so. Near field signals show unique amplitude and phase changes with distance from the transmitter. In particular E field and H field antennas couple in different ways to the signal with different amplitude decay profiles and different signal phase changes with distance. These amplitude and phase profiles may be used to measure distance. In particular, by comparing E field and H field phase or E field and H field amplitude, distance may be determined by referring to the theoretical predictions for the measured property as a function of distance. Alternatively, the signal properties may be pre-measured for a particular site to account for site specific disturbances and the range measurement compared with previously measured data. An E field antenna is typically a whip antenna and may be on the order of a meter in length for a 1 MHz signal. An H field antenna is typically a coil and may include a ferrite core. The H field antenna may be on the order of a few centimeters in length, width, and height. Thus, it can be advantageous to utilize magnetic antennas for mobile units because of the compact size and to use both E field and H field antennas for the fixed units because of the size of the whip antenna. In some situations however, the reverse may be desired. Numerous variations are disclosed in the applications incorporated by reference above.

In particular, an often preferred configuration utilizes a magnetic antenna (H field antenna) for the mobile beacon transmitter (active location tag) and a vertically polarized E field antenna with two orthogonally oriented H field antennas for each of the fixed receiver locations. The two H field antennas have the null axes in the horizontal plane. An exemplary signal set from this arrangement includes:

E, Electric field strength from the E field antenna
H1, magnetic field strength from the first H field antenna
H2, magnetic field strength from the second H field antenna
EH1, phase angle between E and H1 signals
EH2, phase angle between E and H2 signals Thus, multiple determinations of range may be made from this configuration by making different comparisons between E field and H field amplitude and phase. Typically, a weighted average of available determinations is used based on the strongest or most reliable signals from the set.

To find a position within an area, as needed for the exemplary warehouse example, typically multiple receivers are positioned to allow triangulation based on multiple range measurements, i.e., to each location receiver from the active location tag. If height is desired, additional receivers may be deployed to improve the height resolution. The receivers may be connected to a central computer for combining the measurements from all receivers to determine location. The connection may be by wired or wireless network or other methods as desired.

In a further alternative embodiment, the area may be pre-measured to account for specific local propagation disturbances and to reduce errors from equipment variations. A calibration set of measurements is made by placing an active location tag at known locations and measuring the signals and phases at all receivers. A finer grid, or set of grids, of locations may be generated from extrapolation and interpolation from the measured locations. In operation, an unknown location is determined by transmitting from the unknown location and comparing the set of measured data from all receivers with the stored calibration data to find a location having the best match. Best match may be determined by summing absolute value of the differences between each respective signal from each receiver, the best match being the lowest sum. In the sum, amplitudes and phases may be scaled to have similar effect on the sum. Weak signals may be ignored. Other criteria may be applied to weight each element. Other matching criteria such as sum of squared differences or other error criteria may be used. In one embodiment, a location is determined as the centroid of a region having an error value above a predetermined threshold. In further embodiments, motion constraints, such as walls and motion dynamics including momentum are used to improve position.

Locator-Receiver Functional Block Diagram

Figure 7:
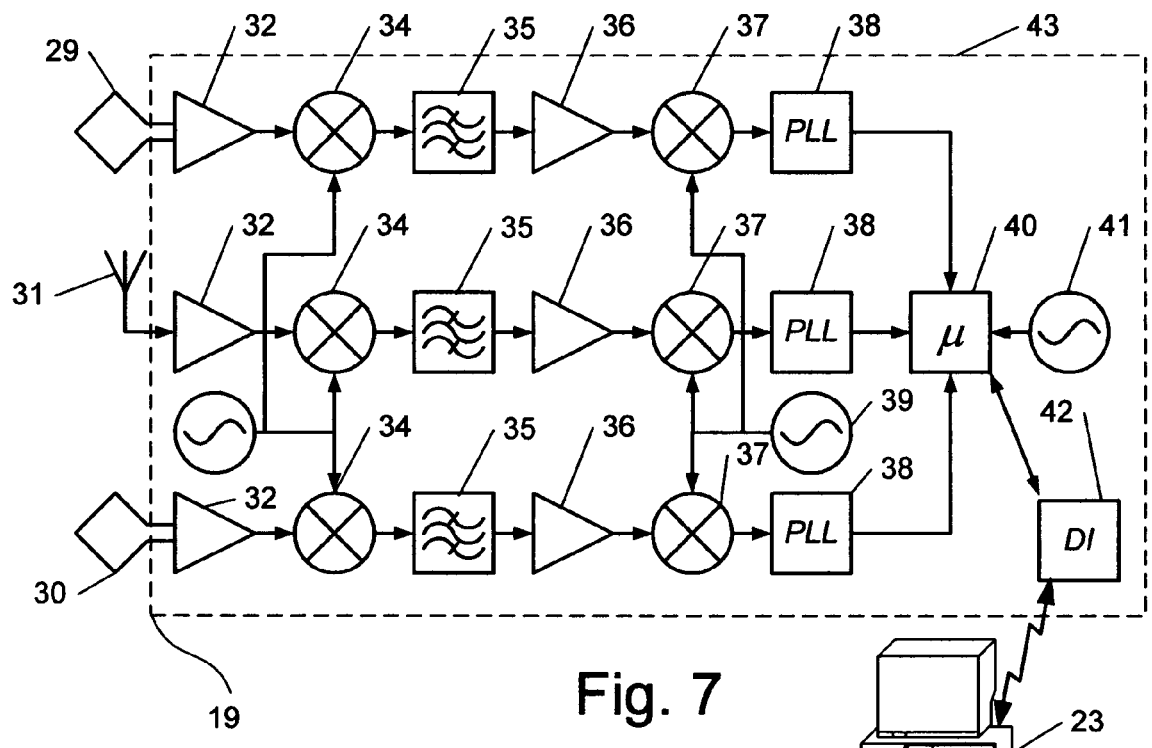
FIG. 7 is a functional block diagram showing an exemplary near field locator receiver for use in conjunction with an asset and personnel location, identification, and movement system.
Figure 7:
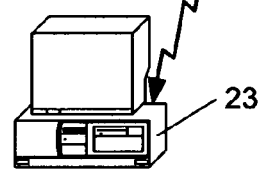

FIG. 7 is a functional block diagram showing an exemplary near field locator receiver 19 for use in conjunction with an asset and personnel location, identification, and movement system. In a preferred embodiment, locator receiver 19 comprises a first magnetic antenna 29, an electric antenna 31, a second magnetic antenna 30 (collectively, "three antennas"), and locator receiver board 43. Locator receiver board 43 comprises first (pre-) amplifiers 32, and first mixers 34 that mix RF signals from three antennas with a signal from first local oscillator 68 to yield intermediate frequency (IF) signals. Band pass filters 35 and second amplifiers 36 convey IF signals to second mixers 37 that mix IF signals with a signal from a second local oscillator to yield baseband signals. Phase lock loops 38 stabilize response, increase stability, and reduce noise of baseband signals. A microprocessor 40 compares baseband signals to timing signals from clock 41 to measure phase differences between baseband signals. In one embodiment, the signals E, H1, H2, EH1, and EH2 as described above being E field and H field magnitudes and phases are measured by the receiver. Microprocessor 40 conveys results to computer 23 via data interface 42. Data interface 42 may be a wired or wireless data network capable of transferring data between microprocessor 40 and computer 23.

Figure 8:
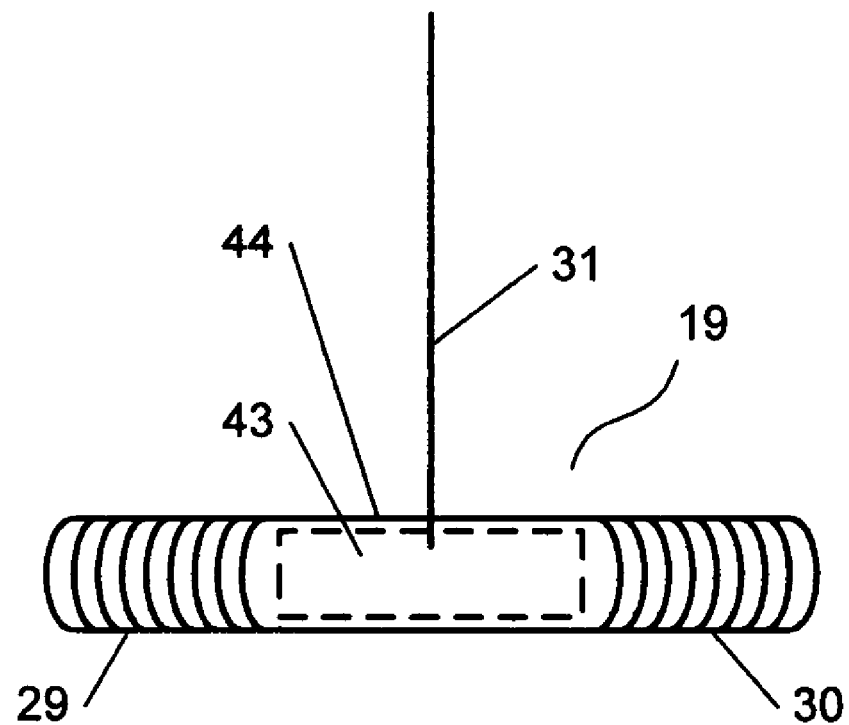
FIG. 8 is a mechanical diagram showing a side view of a locator receiver for use in conjunction with an asset and personnel location, identification, and movement system.

FIG. 8 is a mechanical diagram showing a side view of a locator receiver 19 for use in conjunction with an asset and personnel location, identification, and movement system. Locator receiver 19 comprises first magnetic antenna 29, electric antenna 31, second magnetic antenna 30, locator receiver board 43, and enclosure 44. First magnetic antenna 29 and second magnetic antenna 30 are arranged so as to have mutually orthogonal nulls oriented in the plane of the floor of the warehouse.

Figure 9:
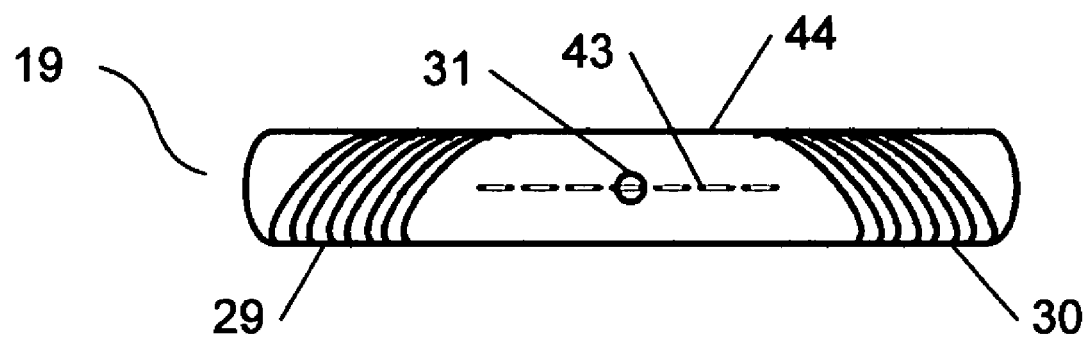
FIG. 9 is a mechanical diagram showing a top view of a locator receiver for use in conjunction with an asset and personnel location, identification, and movement system.

FIG. 9 is a mechanical diagram showing a top view of a locator receiver 19 for use in conjunction with an asset and personnel location, identification, and movement system. Locator receiver 19 comprises first magnetic antenna 29, electric antenna 31, second magnetic antenna 30, locator receiver board 43, and enclosure 44. First magnetic antenna 29 and second magnetic antenna 30 are arranged so as to have mutually orthogonal nulls with null axes in the horizontal plane. FIG. 9 shows the first magnetic antenna 29 and second magnetic antenna 30 as exemplary coils 29 and 30 respectively. FIG. 9 further illustrates the exemplary coils 29 and 30 wound on the enclosure 44 which is used as a coil form 44 for coils 29 and 30. Note the diagonal winding of the coils 29 and 30 on the linear coil form 44. The diagonal winding is to rotate the null axis 45 degrees relative to the axis of the form 44 so that the null axes of the two coil null axes for coils 29 and 30 may be orthogonal, 90 degrees from one another.

Active Location Tag Functional Block Diagram

Figure 10:
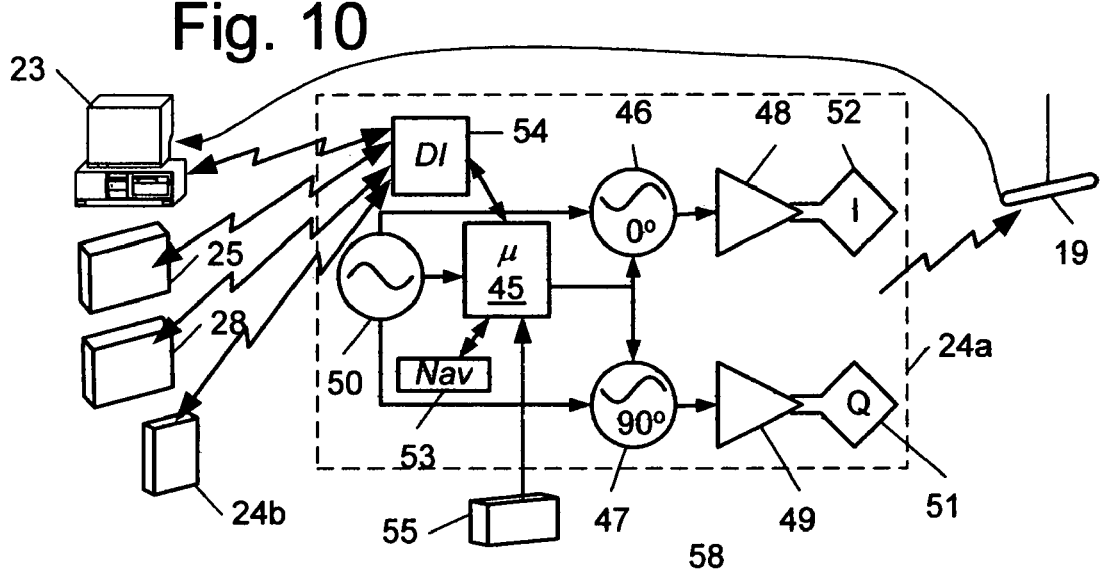
FIG. 10 is a functional block diagram showing an exemplary active location tag for use in conjunction with an asset and personnel location, identification, and movement system.

FIG. 10 is a functional block diagram showing an exemplary active location tag for use in conjunction with an asset and personnel location, identification, and movement system. Active location tag 24a comprises a clock or frequency reference 50, a microprocessor 45, a data interface 54, a navigation sensor and/or other sensors 53, a first RF oscillator 46, a second RF oscillator 47, a first RF amplifier 48, a second RF amplifier 49, a first (I) magnetic antenna (52), and a second (Q) magnetic antenna (51), and, if provided, a lift position sensor 55 for a forklift.

A data interface 54 provides for data to be conveyed to or received from the computer 23 or other devices on the network, such as an LIDR 25, a passive tag reader 28, or another active location tag 24b. The data interface 54 may be a wireless data network such as ZigBee®, WiFi®, or other network or communication link. In alternate embodiments, data interface 54 may be a receive-only simplex link and signals generated by a first (I) magnetic antenna 52 and a second (Q) magnetic antenna 51 may be modulated to transmit data.

In a preferred embodiment, the first RF amplifier 48 and the second RF amplifier 49 have an input power of 50 mW so that active tag 24 is in compliance with FCC regulations Part 15.219. Also in a preferred embodiment, a first RF oscillator 46, and a second RF oscillator 47 are phase offset so as to yield a quadrature transmit signal with omni-directional properties, i.e., first magnetic antenna is driven 90 degrees out of phase with respect to second magnetic antenna Signals generated by a first (I) magnetic antenna 52 and a second (Q) magnetic antenna 51 cooperate to yield a near-field signal which may be detected by one or more locator receivers 19 to determine the location coordinates of the active location tag.

The active location tag may also include an optional navigation sensor 53. The navigation sensor may include one or more of a magnetic compass, odometer, accelerometer, speedometer, gyro, turn sensor, or other devices that may assist the RF positioning system in determining a position or orientation. Navigation may be used to filter noisy RF position measurements, to dead reckon in locations with weak RF coverage, or to provide additional dimensions of measurement, such as azimuth orientation of the forklift. In one embodiment, a motion sensor, such as an accelerometer, may be used to detect motion related to unauthorized movement of assets.

Passive ID Tag Reader Functional Block Diagram

Figure 11:
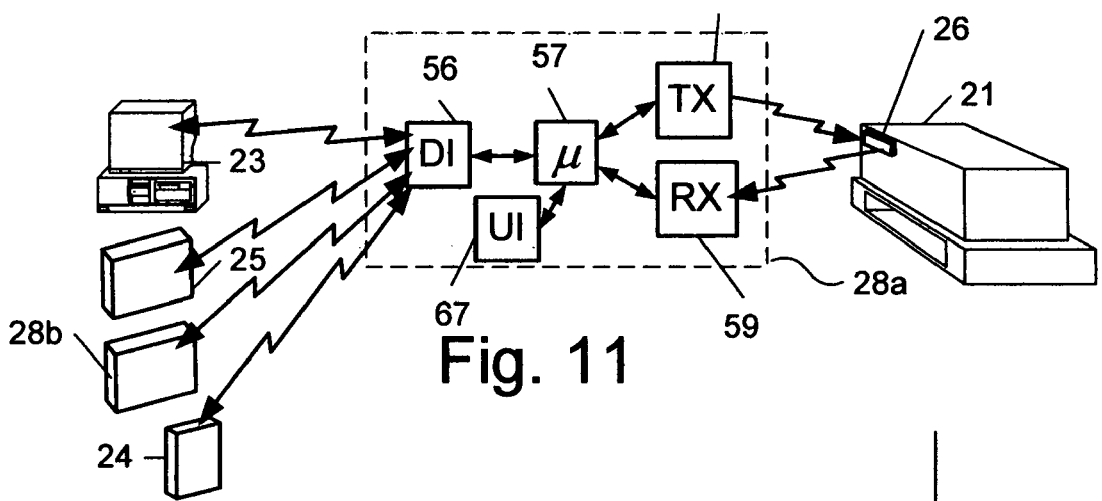
FIG. 11 is a functional block diagram showing an exemplary passive ID tag reader for use in conjunction with an asset and personnel location, identification, and movement system.

FIG. 11 is a functional block diagram showing an exemplary passive ID tag reader 28 for use in conjunction with an asset and personnel location, identification, and movement system. Passive tag reader 28a comprises data interface 56, microprocessor 57, transmitter 58, and receiver 59.

A data interface 56 provides for data to be conveyed to or received from a computer 23 or other devices on the network such as an LIDR 25, another passive ID tag reader 28b, or an active tag 24. A data interface 54 may be a wireless data network such as ZigBee®, WiFi®, or other network.

The ID tag reader also includes an operator switch to initiate an ID reading. The switch may also initiate a location reading from the active location tag. In one embodiment, upon receipt of an ID reading by the computer 23, the computer will initiate a location reading from the active location tag that is associated with the ID reader as set up in the computer software.

Transmitter 58 excites passive tag 26 and receiver 59 receives identifying information from passive tag 26. In a preferred embodiment, passive ID tag 26 combines a bar code and an RFID device. Passive tag reader 58 uses a laser to read the bar code of passive tag 26, and an RFID reader to receive data from an RFID chip embedded in passive tag 26. In alternate embodiments, optical pattern or other technologies may be incorporated in passive tag 26.

Passive tag readers typically have a short operational range, thus the positioning of the mover together with the reading of the ID tag indicates the ID tag and associated asset are close to the location of the mover. By proper training of the worker to, for example, perform location and identification operations with the forklift directly in front of and close to the asset, the measurements may be made more accurate and repeatable.

Passive tag reader 28a further includes user interface 67. User interface 67 can convey such information to worker 18 as a destination, status, or other information pertinent to asset 21 in particular and the logistics process in general.

Locating Identification Reader (LIDR)

Figure 12:
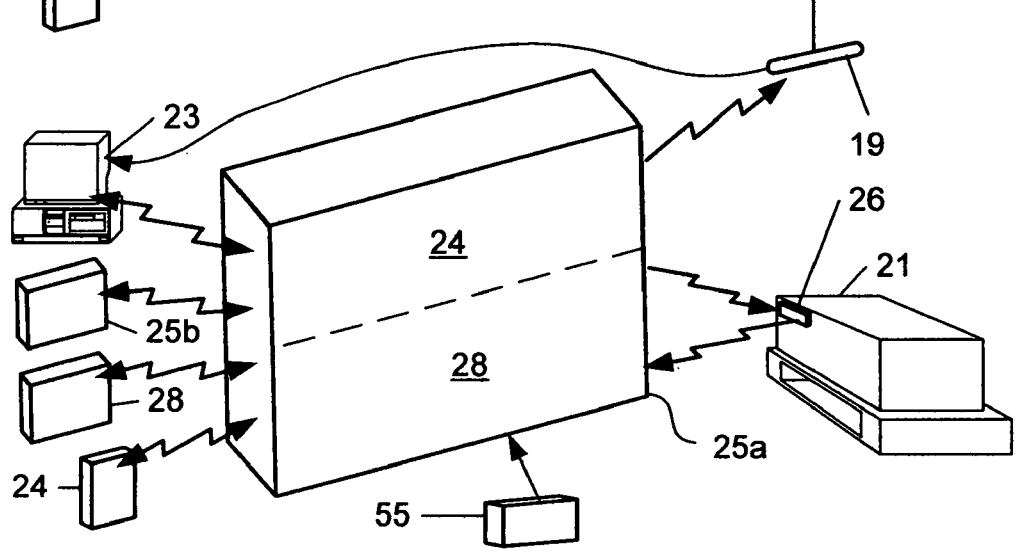
FIG. 12 is a block diagram showing interfaces for an exemplary LIDR for use in conjunction with an asset and personnel location, identification, and movement system.

FIG. 12 is a block diagram showing interfaces for an exemplary LIDR 25 for use in conjunction with an asset and personnel location, identification, and movement system. The LIDR 25a combines the functionality of the active location tag 24 and passive ID tag reader 28 in a single device package. A LIDR 25 may include data interfaces for data to be conveyed to or received from a computer 23 or other devices on the network such as another LIDR 25, a passive ID tag reader 28, or an active location tag 24. A LIDR 25 radiates a signal capable of being localized by a locator-receiver 19. A LIDR 25 also can interrogate passive tag 26 so as to acquire identification data pertinent to asset 21.

The LIDR may be mounted on a moving vehicle such as a forklift, hand truck, pallet jack or other vehicle, or may be carried by a worker. Advantages of the LIDR include the fixed association of the active location tag and passive ID reader, the convenience of having both devices in one package, and the sharing of interface, battery and computer resources.

Alternate Embodiment Active Location Tag Mechanical Diagram

Figure 13:
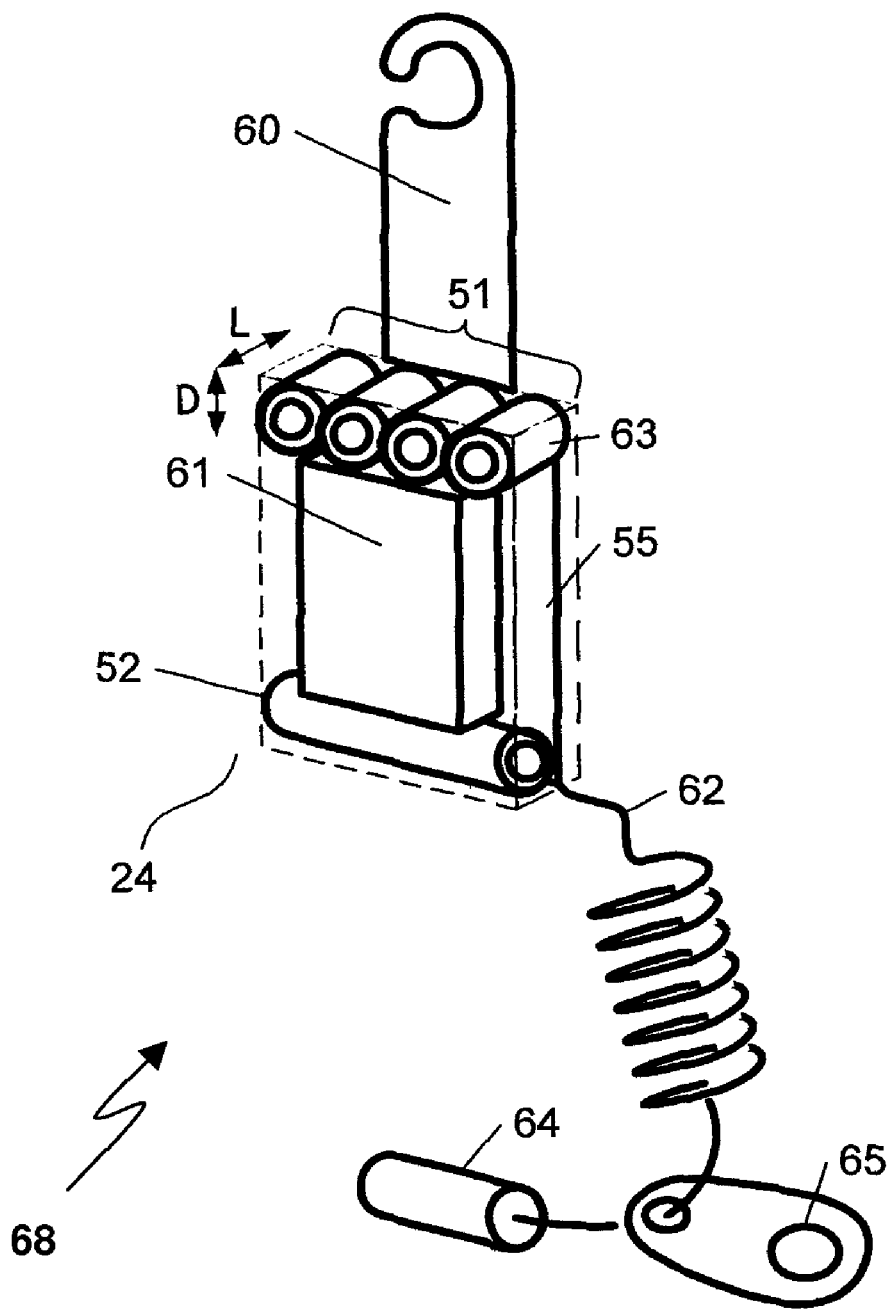
FIG. 13 is a mechanical diagram showing an alternate embodiment active tag for use in conjunction with an asset and personnel location, identification, and movement system.

FIG. 13 is a mechanical diagram showing an alternate embodiment active tag 68 for use in conjunction with an asset and personnel location, identification, and movement system. Alternate embodiment active tag 68, battery 61, first magnetic antenna 51 comprising a plurality of hollow core magnetic antennas 63, second (Q) magnetic antenna comprising an orthogonal hollow core magnetic antenna 52, hanger 60, power cord 62, power jack 64 and power outlet cover holder 65.

Short magnetic antennas cylindrical cores with a small length to diameter ratio (L/D<~10) tend not to have an effective permeability ($\mu_e$) much greater than ten no matter what the effective bulk permeability of the bulk core material (see for instance M. F. "Doug" DeMaw, *Ferromagnetic Core Design & Application Handbook*, Starkville, Miss.: MFJ Publishing Company, 1996, p. 41). The inventors have discovered that if a core is relatively short (L/D<~10) hollow cores (like those of hollow core magnetic antennas 63) yield performance comparable to those of analogous solid cores. Hollow cores are advantageous because of less material and therefore lower weight and less cost.

In preferred embodiments, hanger 60 is preferentially relatively stiff and allows alternate embodiment active tag 68 to be substantially rigidly mounted on a rear-view mirror of a vehicle or other placement. The relative stiffness of hanger 60 prevents alternate embodiment active tag 68 from substantial swinging that might impair stability or performance. Hanger 60 makes alternate embodiment active tag 68 well-suited for use in conjunction with tracking rental or other vehicles or for tracking forklifts. Power cord 62 and jack 64 cooperate to allow alternate embodiment active tag 68 to be plugged into a standard 12V ("cigarette lighter") car power jack or other power outlet.

CONCLUSION

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. One should understand that numerous variations may be made by one skilled in the art based on the teachings herein. Thus, the breadth and scope of the present invention should not be limited by any of the above-described exemplary embodiments, but should be defined only in accordance with the following claims and their equivalents.

We claim:

1. An asset control method comprising:
    identifying an asset comprising the steps of:
        associating an identification tag with said asset; and
        reading said identification tag with a passive ID tag reader physically associated with a mover;
    loading said asset on said mover, said mover having an active location tag thereon;
    logically associating said asset with said active location tag;
    moving said asset by said mover to a destination location;
    determining location coordinates for said mover at said destination location based on signals from said active location tag;
    unloading said asset from said mover; and
    logically disassociating said asset from said active location tag;
    recording destination location coordinates of said asset based on said determining said location coordinates for said mover at said destination location.

2. The asset control method of claim 1, wherein the identification tag is an RFID tag.

3. The asset control method of claim 1 wherein the identification tag is an optical barcode label.

4. The asset control method of claim 1, further including the step of utilizing a near field signal to track said active location tag.

5. The asset control method of claim 1, further including the step of selecting said destination location for said asset based on said reading of said identification tag.

6. The asset control method of claim 1, further including the step of wirelessly communicating said reading of said identification tag to a computer.

7. The asset control method of claim 6, wherein the wireless communication of said reading utilizes a radio frequency transmission of said active location tag.

8. The asset control method of claim 1, further including the step of determining the location coordinates for said asset by measured extension from the location coordinates for said mover.

9. The asset control method of claim 8, wherein the measured extension from the location coordinates for said mover includes a vertical dimension.

10. A logistics location and identification system comprising:
    an active location tag for transmitting a location signal;
    a set of locator receivers for receiving said location signal;
    a computer in communication with said set of locator receivers, said computer configured for receiving measurements of said location signal made by said set of locator receivers and computing location coordinates of said active location tag based on said measurements of said location signal; and
    an ID tag reader in communication with said computer, said ID tag reader for reading an asset identification from a passive ID tag associated with an asset;
    said ID tag reader and said active location tag to be carried by a mover, said mover for moving said asset to a destination location;
    said computer configured for determining destination location coordinates for said active location tag based on said measurements of said location signal upon arrival of said asset at said destination location while said active location tag is in known relative proximity to said asset;
    said computer configured for associating said destination location coordinates with said asset identification.

11. The logistics location and identification system as in claim 10, wherein said passive ID tag is an RFID tag or an optical barcode label.

12. The logistics location and identification system as in claim 10, wherein said measurements of said location signal comprise near field signal measurements.

13. The logistics location and identification system as in claim 12, wherein said near field signal measurements comprise a comparison of E field and H field phase.

14. The logistics location and identification system as in claim 10, wherein said mover comprises a forklift, a handtruck, or a pallet jack.

15. The logistics location and identification system as in claim 10, wherein said mover comprises a person.

16. The logistics location and identification system as in claim 10, wherein said reading said asset identification occurs prior to said moving said asset to said destination location.

17. A logistics location and identification system comprising:
- an active location tag for transmitting a location signal;
- means for determining location coordinates for said active location tag based on said location signal;
- an ID tag reader in communication with a computer, said ID tag reader for reading an asset identification from a passive ID tag associated with an asset;
- said ID tag reader and said active location tag to be carried by a means for moving said asset to a destination location,
- wherein said location coordinates for said active location tag are determined by said means for determining said location coordinates upon arrival of said asset at said destination location while said active location tag is in known relative proximity to said asset;
- said logistics location and identification system configured for storing said destination location coordinates associated with said asset identification.

18. The logistics location and identification system as in claim 17, wherein said means for determining location coordinates is configured to utilize near field signal measurements of said location signal.

19. The logistics location and identification system as in claim 17, wherein said reading said asset identification occurs prior to said moving said asset to said destination location.

20. The logistics location and identification system as in claim 17, wherein said passive ID tag is an RFID tag or an optical barcode label.

21. The system in accordance with claim 8, wherein the measured extension is vertical extension, horizontal extension, or direction.

22. The system in accordance with claim 21, further including a direction measuring device configured to measure the direction of said extension, and said measured extension includes extension direction measured by said direction measuring device.

23. The system in accordance with claim 22, wherein said direction measuring device comprises a magnetic compass or a radio direction device.

* * * * *